Patented Dec. 16, 1947

2,432,797

UNITED STATES PATENT OFFICE 2,432,797

ORGANIC THIOL ANTITOXIC AGENTS

Rudolph Albert Peters, Lloyd Arthur Stocken, and Robert Henry Stewart Thompson, Oxford, and Foster Neville Woodward, Alfred Frank Millidge, and Edward James Gasson, London, England, assignors to Minister of Supply in His Majesty's Government of United Kingdom of Great Britain and Northern Ireland, London, England No Drawing. Application April 28, 1943, Serial No. 484,912. In Great Britain March 24, 1942

8 Claims. (Cl. 167—58)

This invention relates to substances capable of acting as antidotes and prophylactics against the lethal action of trivalent arsenical compounds on living cells, and to a process of preparing such substances.

More particularly the invention relates to substances acting as antidotes and prophylactics against arsenical chemical warfare substances such as chlorvinyl-dichlor-arsine (lewisite) and other trivalent arsenical vesicants.

Considerable investigation has been carried out recently on the effect of monothiol compounds in inhibiting the toxic effects of trivalent arsenical compounds on living cells, both in vitro and in vivo, and while the said monothiol compounds were demonstrably effective in this respect when used in relatively high concentrations, against aromatic therapeutic arsenicals, none of the substances was effective against lewisite or other arsenical vesicants.

The theory underlying the use of monothiol inhibitor substances was that on the assumption that the toxic action of arsenic on living cells was due to its reaction with certain essential thiol compounds present in protoplasm said action could be suppressed by ensuring the presence of an external mono-thiol compound competing successfully with the proto-plasmic thiol compound for the arsenic.

The results obtained in the past however, and the ineffectiveness in particular of the monothiols against lewisite and other arsenical vesicants, indicate that the arsenic receptor in living cells must form a far more stable compound with arsenic than any of the simple monothiols hitherto investigated.

The present invention, therefore, aims at providing an improved inhibitor for the toxic effects of trivalent arsenical compounds, and especially arsenical vesicants, said inhibitor being adapted to form a compound with the arsenical compound of at least the same order of stability as that formed with the "arsenic receptor" in living cells. The inhibitor also reverses the toxic action after it has commenced.

The inhibitor of the present invention contains a di-thiol compound—preferably a substituted dithiol compound—of the following general formula:

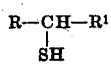

wherein R denotes H, substituted or unsubstituted alkyl, aryl, or aralkyl.

R¹ denotes—C(SH)(R)₂ or C(R)₂.C(SH)(R)₂, (the R's being similar or dissimilar radicles), or of the formula: R(SH)₂, R being in this case an aryl radicle.

Examples of the dithiol compounds which may be used in the inhibitor of the present invention are:

(1) 1.3-dimercaptopropane
CH₂(SH).CH₂.CH₂(SH)

(2) 1.3-dimercaptopropanol
CH₂(SH).CH(OH).CH₂(SH)

(3) 2.3-dimercaptopropanol
CH₂(OH).CH(SH).CH₂(SH)

(4) 2.3-dimercaptopropyl methyl ether
CH₂(OCH₃).CH(SH).CH₂(SH)

(5) 1.2-dimercaptopropane
CH₂(SH).CH(SH).CH₃

(6) 2.3-dimercaptopropyl-amine
CH₂(NH₂).CH(SH).CH₂(SH)

So far as we are aware, compounds 3, 4 and 6, have not been described in the literature.

It has in fact been ascertained that dithiol compounds of the foregoing general formulae do form stable arsenical rings with trivalent arsenical compounds, and especially with arsenical vesicant substances such as lewisite.

The inhibitor of the present invention accordingly comprises a dithiol compound of the aforesaid kind composited with a vehicle which may be a volatile solvent, a solvent oil, or ointment base, such as lanoline.

The proportions of dithiol compounds to vehicle may vary widely and advantageously from 10–20% dithiol compound to 90–80% vehicle may be used, one ointment being made up for example as follows:

| | Grams |
|---|---|
| Hardened palm kernel oil | 8 |
| Ethyl phthalate | 8 |
| 2.3-dimercaptopropanol | 4 |
| Talc | 20 | yielding a 10% ointment.

Dithiol compounds of the foregoing general formula are advantageously prepared in accordance with the invention by treating the appropriate paraffin, alcohol or other substituted paraffin dihalides and preferably the bromides with alkali hydrosulphides in alcoholic solution.

The reaction between the substituted or unsubstituted paraffin dihalides and alkali hydrosulphide may be carried out at room temperature in which case a period of several days is required for the completion thereof, or at a slightly elevated temperature of the order of 30–50° C. and under a moderate superatmospheric pressure of hydrogen sulphide in which case the reaction is completed in from 30 to 72 hours depending on the temperature used.

Examples of the preparation of dithiol compounds, adapted for use in the inhibitor of the present invention will now be given.

EXAMPLE I

2.3-DIMERCAPTO PROPANOL (DTH)

6 molecular equivalents of sodium were dissolved in ethyl alcohol to give an approximately 5% solution, which was then saturated with dry hydrogen sulphite. To this was added 1 molecular equivalent of 2.3-dibromopropanol, and the mixture allowed to stand for a week at room temperature. The solution was then acidified with strong HCl (blue to Congo red), and after filtering off the salt the alcohol and water were removed by evaporation under reduced pressure at low temperature.

The residue was then extracted with chloroform (or other suitable solvent, e. g., benzene), water being added to dissolve any salt which may have separated. The aqueous portion was then re-extracted with chloroform and the two chloroform fractions combined. After drying over $Na_2SO_4$ the solution was filtered and the chloroform evaporated off under reduced pressure. The residue was then distilled at low pressure giving 65% of the theoretical yield of DTH.

B. P. 89°/0.5 mm., 95°/1.0 mm.

Analysis found: S (Carius)=51.9%; SH (iodine titration)=53.2%.

$C_3H_8OS_2$ requires: S=51.6%; SH=53.2%.

BENZALDEHYDE DERIVATIVE (2-phenyl 5-hydroxymethyl 1.3 dithiolane)

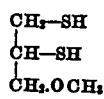

M. P. 77° C.; B. P. 207°/1.5 mm. (with slight decomposition); S, found 30.4%; $C_{10}H_{12}OS_2$ requires 30.2%.

The above method of preparation depends on the reaction $$RBr + NaSH \rightarrow RSH + NaBr$$

But since $2NaSH \rightleftharpoons Na_2S + H_2S$, conditions must therefore exist which prevent the dissociation of NaSH, i. e., working at low temperature or in a closed system at higher temperatures.

EXAMPLE II

2.3-DIMERCAPTO PROPYL METHYL ETHER

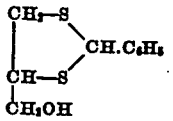

This compound was prepared in a manner similar to that set forth in Example I, starting from 2.3-dibromopropyl methyl ether.

The product has a B. P. of 68°/1.0 mm. Analysis: S, found 46.0%; theory 46.4%.

EXAMPLE III

1.2-DIMERCAPTOPROPANE

This compound was prepared from 1.2 dibromopropane and an alcoholic solution of sodium sulphide, but owing to the fact that this substance distils over with the acidified alcohol, it was not possible to adopt precisely the same separation procedure as is followed in Examples I and II; precipitation by water was also found to be unsatisfactory.

Therefore when the reaction was complete an amount of 10 N NaOH equivalent to the NaSH used in the preparation was added to the mixture, and the alcohol and water removed in vacuo. Strong HCl was then added to the residue (cooling externally the while) until acid to Congo, and the mixture of salt, water and dithiol compound was filtered. The dithiol compound was then separated off and the aqueous layer extracted once with ether. Both fractions were dried over $Na_2SO_4$ and after the ether had been evaporated off the residue was combined with the other fraction and distilled.

Yield 56%; B. P. 152°/760 mm.; S, found 59.5%; theory 59.3%.

EXAMPLE IV

2.3-DIMERCAPTOPROPYLAMINE

This compound was prepared by heating 1 mol. dibrompropylamine hydrochloride with 6 mols. $NH_4SH$ in methyl alcohol in a sealed vessel at 80° C. for 12 hours. The product was evaporated in vacuo to remove $NH_4SH$ and alcohol, the residue taken in a small volume of water and extracted many times with chloroform. The chloroform solution was dried over $Na_2SO_4$, filtered and evaporated. The residue was distilled at low pressure.

B. P. 65–75° C./1.0 mm., yield 20%. SH value (by iodine titration) 102%. The hydrochloride was obtained by passing HCl gas through a benzene solution.

EXAMPLE V

The best yield of 2.3-dimercaptopropanol (DTH) on a laboratory scale was obtained by proceeding in the following manner:

200 grs. caustic soda were dissolved in 1 litre of pure denaturant free methyl alcohol, the resulting solution being saturated with hydrogen sulphide of which a 5 to 10% excess in solution was obtained by cooling the mixture to −5° C. and passing a slow stream of $H_2S$ for 2–3 hours.

Sufficient of the resulting solution (460 ml.) was brought into contact with 100 grs. of pure dibromopropanol in a cooled pressure bottle of just over ½ litre capacity to give a 100% excess of sodium hydrosulphide the bottle being sealed and then heated either for 72 hours at 30° C. or at 40° C. for 30 hours. The pressure generated depended on the initial quantity of dissolved $H_2S$ present, a 12% excess giving pressures of 50 lb./sq. in. at 40° C. and 36 lbs./sq. in. at 30° C.

After the completion of the reaction the contents of the bottle were made just acid with glacial acetic acid and the bulk of the methyl alcohol distilled off under reduced pressure. The residue was shaken with sufficient water to dissolve the sodium acetate and bromide and the mixture was extracted three times with methylene chloride or chloroform. The extract was freed from suspended water by filtration and the solvent removed on a water bath, the last traces being removed by heating the residue at 90° C. and 200 mm. pressure for 15 minutes.

The crude 2.3-dimercaptopropanol was then stabilised by passing ammonia gas therethrough for a few minutes, the ammonia being completely absorbed and the quantity required being from 0.1 to 0.5% by weight of the crude dimercaptan.

The product may also be stabilised by the addition of 0.5% of aqueous ammonia (S. G. 0.880).

It was then distilled under reduced pressure, using a capillary leak of coal gas, hydrogen or nitrogen to obtain uniform ebullition the yield being 80% of 98–100% pure 2.3-dimercaptopropanol.

If the corresponding dichloropropanol be taken instead of 2.3-dibromopropanol in the foregoing example even though the reaction mixture be heated to 80° C. for 5 hours under a generated pressure of 72 lbs./sq. in. the reaction does not proceed with the same facility, the yield being about 43% of 2.3-dimercaptopropanol with a 23–24% recovery of the dichloropropanol.

In general however, good yields can be obtained at temperatures higher than 40° C., provided the hydrogen sulphide pressure is sufficient to limit the dissociation of the alkali hydrosulphide.

EXAMPLE VI

When preparing 2.3-dimercaptopropanol on a technical scale, some modification of the procedure given in the foregoing examples is desirable and consists mainly in the provision of an extra stabilisation stage.

Thus, a solution of 16 lbs. commercial caustic soda in 63 lbs. of methyl alcohol is saturated eventually at 0° C. with hydrogen sulphide until about a 10% excess is present over that required for the formation of sodium hydrosulphide. 26 lbs. of 2.3-dibromopropanol is added to this solution at 0° C. in a 10-gallon agitated jacketed enamelled low pressure autoclave, the vessel being sealed and stirred to mix the contents thoroughly. The temperature of the mixture is then raised gradually to 30–35° C., when the superatmospheric pressure reaches 15–25 lbs./sq. in. and an exothermic reaction occurs, which is controlled by cooling the vessel. The temperature is maintained at 30–40° C. for 18 hours and then raised to 50–60° C. during one hour and maintained at this temperature for a further hour at a superatmospheric pressure of 40–50 lbs./sq. in.

The vessel is then cooled to room temperature, the excess pressure released, the alcoholic solution of the product decanted from the saline sludge, the latter being extracted twice with methyl alcohol. The united alcoholic solutions are acidified with acetic acid with stirring and then stabilised prior to distilling off the solvent by adding strong ammonia solution until the product is faintly alkaline.

The bulk of the methyl alcohol is then distilled off under reduced pressure and the residue extracted with sufficient water to remove saline sludge and then with methylene chloride three times. The methylene chloride extracts are dried over sodium sulphate, filtered and the solvent removed by distillation under reduced pressure. The residual crude 2.3-dimercaptopropanol is distilled in either a batch or continuous type of still but in the former case a second stage of stabilisation is desirable by the addition to the still contents of 0.5% of nitrogenous bases such as ammonia gas, aqueous ammonia, (S. G. 0.880) ammonium acetate, triethanolamine, diethanolamine or monoethanolamine.

The first stabilisation stage is of great advantage in preventing undesirable side reactions due to the presence of small quantities of unreacted dibromopropanol.

The second stabilisation stage also has a specific stabilising effect on the product.

The yield of 2.3-dimercaptopropanol is about 9.5–10 lbs. or 65% of theory on the dibromopropanol.

Prior to the second stabilisation stage it is important to remove the last traces of methylene chloride or chloroform before the addition of ammonia, otherwise reaction occurs between the solvent and the dimercapto body when the mixture is heated.

When working up an unstable or partially decomposed batch of 2.3-dimercaptopropanol, the method of extraction by alkali may be used according to the invention in order to remove unreacted dibromopropanol and certain other products which might cause instability.

To this end the crude product is dissolved in methylene chloride and extracted with the calculated quantity (based on thiol content) of 5 N aqueous caustic soda. The alkaline extract is made just acid with glacial acetic acid, the temperature of the mixture being kept below 30° C. and extracted with methylene chloride. The extract solution is stripped, stabilised with ammonia and distilled.

If the extraction be carried out with benzene instead of methylene chloride, the losses due to the reaction between the dimercapto compound and the halogenated solvent in alkaline solution can be completely avoided if a sufficient number of extractions be made.

The efficacy of the dithiol compounds used in the inhibitors of the present invention is shown by the experiments set forth in the following description.

One principle involved in demonstrating this inhibitory action is the discovery in accordance with the present invention that the said dithiol compounds are able to abolish or diminish the suppression of the pyruvate oxidase enzyme system brought about by the introduction of an arsenical substance such as lewisite or lewisite oxide into the sphere of reaction.

The pyruvate oxidase system in brain has been selected since it has been ascertained that this enzyme system is highly sensitive to arsenical poisoning.

Pigeon brain "Brei" respiring in Ringer phosphate solution (pH 7.3) at 38° C. was used for these tests.

The thiol compounds were made up in a small volume of dilute alkali and were brought to the required concentration with phosphate buffer, so that the H-ion concentration of the buffered respiring medium was not noticeably altered by their addition. The oxygen consumption of the system was then determined over three consecutive half hour periods by the use of Warburg micro-respirometers.

The following table provides comparison of the percentage suppression of oxygen uptake produced by lewisite oxide in the absence and presence of the dithiol compounds of the present invention. In each experiment the dithiol was added to the system immediately before the addition of the lewisite oxide.

*Table 1*

| Compound | Conc. ×10⁻⁵ M | Per cent Suppression of Oxygen Uptake | | | | | |
|---|---|---|---|---|---|---|---|
| | | Lewisite Oxide 1.6×10⁻⁵ M added | | | Lewisite oxide 1.6×10⁻⁵ M and dithiol added | | |
| | | 0–30' | 30–60' | 60–90' | 0–30' | 30–60' | 60–90' |
| 1 Toluene 3.4-Dithiol | 2.1 | 67 | 59 | 69 | 0 | 1 | 10 |
| 2 do | 21.4 | 67 | 59 | 69 | 0 | 0 | 0 |
| 3 do | 2.1 | 63 | 61 | 72 | 3 | 21 | 27 |
| 4 2.3 Dimercapto propanol | 5.4 | 72 | 46 | 47 | | 18 | 15 |
| 5 do | 27 | 72 | 46 | 47 | 0 | 0 | 0 |
| 6 do | 27 | 51 | 46 | 46 | 0 | 3 | 0 |
| 7 do | 13.5 | 47 | 47 | 40 | 0 | 3 | 0 |
| 8 1.3-dimercapto propanol | 5.4 | 45 | 47 | 42 | 12 | 20 | 23 |
| 9 do | 27 | 45 | 47 | 42 | 0 | 2 | 2 |
| 10 do | 6.2 | 49 | 52 | 50 | 4 | 6 | 4 |
| 11 do | 30.9 | 49 | 52 | 50 | 0 | 0 | 0 |

The above tests carried out in vitro show that these dithiol compounds either markedly diminish or completely abolish the suppression of oxygen uptake produced by lewisite oxide. Moreover, this effect is present in dilute solutions of the dithiols; thus in the case of 2.3-dimercapto propanol a very marked reduction in the toxicity of lewisite is brought about by 4 mols of dithiol compound while the toxicity is completely abolished by 8.5 mols. In contradistinction thereto, 27 mols monothioethylene glycol completely failed to protect against the effects of the same concentration (1.6×10⁻⁵ M) of lewisite oxide.

Similar results have been obtained with DTH against phenyl arsenious oxide and sodium arsenite.

Tests carried out in vitro on the antidotal properties of the dithiol compounds show that it is possible to bring about reversal of the toxic action of arsenical substances and especially vesicants by application of dithiol compounds, and especially 2.3-dimercaptopropanol, after poisoning for 45 minutes.

The said dithiol compounds may be either applied by inunction, injection or oral administration.

In tests carried out in vivo on rats the fur was removed from a small area on the back of each animal and between 1 and 2 lethal doses of vesicant arsenical compound such as lewisite, was placed in the middle of the exposed area. After varying intervals a measured amount of a dithiol compound such as 2.3-dimercapto-propanol was lightly spread over the resulting burn with a glass rod.

The following table gives the results of tests on rats. In the earlier tests a large excess of 2.3.-dimercapto-propanol was used, approximately 50–70 mgms. being applied to a burn caused by 3–8 mgms. lewisite, but in test No. 6 the same quantity of 2.3 dimercapto-propanol was applied as in the preceding tests, but the excess remaining on the skin was rubbed off with cotton wool at the end of 5 minutes.

*Table 2*

SUMMARY OF INUNCTION TREATMENT OF LEWISITE BURNS ON RATS

| Test No. | | No. of animals tested | mgms. lewisite per kilo body weight | No. Mean Lethal Dose | Time between contamination and treatment | Surviving | |
|---|---|---|---|---|---|---|---|
| | | | | | Minutes | Number | Per cent |
| 1 | Untreated | 4 | 27–29 | 1.2–1.3 | | 0 | 0 |
| 2 | do | 6 | 28–33 | 1.2–1.4 | | 0 | 0 |
| 3 | do | 6 | 29–31 | 1.3–1.4 | | 0 | 0 |
| 4 | 2.3 dimercapto propanol | 8 | 28–34 | 1.2–1.5 | 5 | 8 | 100 |
| 5 | do | 4 | 27–33 | 1.2–1.4 | 10 | 4 | 100 |
| 6 | do | 21 | 30–48 | 1.3–2.1 | 30 | 21 | 100 |
| 7 | do | 18 | 30–37 | 1.3–1.6 | 60 | 17 | 95 |
| 8 | do | 16 | 29–39 | 1.3–1.7 | 120 | 14 | 88 |
| 9 | 1.3 dimercapto propanol | 6 | 32–38 | 1.4–1.7 | 45 | 4 | 67 |
| 10 | Toluene 3.4-dithiol | 6 | 28–35 | 1.2–1.5 | 5 | 6 | 100 |
| 11 | do | 6 | 29–34 | 1.3–1.5 | 15 | 2 | 33 |
| 12 | 1.3 dimercapto propane | 5 | 33–39 | 1.4–1.7 | 60 | 4 | 80 |
| 13 | Ethane—1.2-dithiol | 5 | 34–38 | 1.5–1.7 | 60 | 1 | 20 |
| 14 | Mono thioethylene glycol | 6 | 30–38 | 1.3–1.7 | 30 | 0 | 0 |
| 15 | Hydrogen peroxide | 6 | 31–38 | 1.4–1.7 | 30 | 2 | 33 |
| 16 | do | 6 | 34–38 | 1.5–1.7 | 30 | 1 | 17 |
| 17 | do | 12 | 33–39 | 1.4–1.7 | 60 | 4 | 33 |

In test No. 7 the 2.3 dimercapto-propanol was applied in the form of a 10% ointment to 6 of the animals, all of which survived.

In tests 14–17 are given the results using a mono thiol compound and hydrogen peroxide. The mono thiol compound is seen to be quite ineffective although treatment was begun 30 minutes after contamination i. e. at a time at which treatment with 2.3 dimercapto-propanol would have resulted in 100% survival.

As hydrogen peroxide has been proposed as a method of treatment for arsenical vesicants, 24 animals were treated by swabbing the contaminated sites with hydrogen peroxide for 3 minutes; only 7 out of the 24 rats survived.

It has been found that heavy contamination of rats with about 10 lethal doses of lewisite can be successfully treated by inunction with 2.3-dimercapto propanol at the end of about 5 minutes.

A few experiments have also been carried out with guinea pigs; in these animals DTH causes 90% survival when applied 60' after lethal doses of lewisite.

Human tests have shown that vesication following the application of small amounts of lewisite or MA (phenyldichlorarsine) to the skin can be successfully treated by inunction with 2.3.dimercaptopropanol after intervals up to 1 hour.

An inhibitor of the present invention has been shown to be effective when administered by injection against systemic arsenical poisoning. Thus, when DTH, in saturated aqueous solution, was injected intraperitoneally into white rats 7-20 minutes after the intramuscular injection of lethal doses of neutralised sodium arsenite the following results were obtained:

|  | No. rats tested | Dose (mgms. As$_2$O$_3$ per kg. body weight) | Per cent Surviving | Interval between contamination and treatment |
|---|---|---|---|---|
|  |  |  |  | Minutes |
| Untreated | 15 | 10.0-14.6 | 33 |  |
|  | 6 | 15.0-17.3 | 0 |  |
|  | 6 | 18.1-22.0 | 0 |  |
| Treated | 10 | 14.0-18.0 | 90 | 20 |
|  | 6 | 17.4-18.8 | 100 | 12 |
|  | 12 | 18.1-22.4 | 67 | 7 |

The effect of injected DTH was also determined in rats that had received lethal contaminations of lewisite (32-39 mgms. lewisite per kg. body weight):

| Dosage of DTH | No. rats tested | mgms. lewisite per kg. B. W. | Per cent Survivals |
|---|---|---|---|
| 60-70 mgms. DTH/kg. given 1 hr. after contamination followed by 30-35 mgms./kg. 3½ hrs. later | 6 | 33-38 | 100 |
| 60-70 mgms. DTH/kg. given 2 hrs. after contamination followed by 30-35 mgms./kg. 3½ hrs. later | 6 | 32-39 | 100 |

It has also been shown that an inhibitor of the present invention is effective against the toxic actions of trivalent therapeutic arsenicals. Thus, DTH in propylene glycol has been injected intramuscularly at short intervals after the injection of lethal doses of p-hydroxy-m-aminophenylarsenoxide hydrochloride.

ANTIDOTE ACTIVITY OF DTH FOR P-HYDROXY-M-AMINOPHENYLARSENOXIDE HYDROCHLORIDE

|  | No. rats tested | Dose (mgms. arsenical per kg. B. W.) | Per cent Deaths |
|---|---|---|---|
| Untreated | 4 | 18.0-18.1 | 75 at 24 hours. |
|  | 4 | 28.6-29.8 | 75 at 48 hours. |
|  | 6 | 29.8-31.6 | 67 at 6 days. |
|  | 4 | 30.2-31.9 | 100 at 24 hours. |
|  | 4 | 43.7-44.3 | Do. |
|  | 6 | 44.7-52.0 | 83 at 6 days. |
|  | 6 | 42.3-44.7 | 100 at 4 days. |
| Treated | 6 | 29.8-31.6 | 0 at 14 days. |
|  | 6 | 30.0-32.3 | 33 at 15 days. |
|  | 6 | 43.1-46.9 | 0 at 6 days. |
|  | 5 | 47.5-53.0 | 0 at 10 days. |

The effectiveness of the inhibitors of the present invention in suppressing the toxic effects of trivalent arsenical compounds in general and of vesicants such as lewisite in particular, and the comparative ineffectiveness of the corresponding mono thiol compounds in this respect is to be attributed to the ability of the dithiols to combine with trivalent arsenical compounds to form stable ring compounds of the general type:

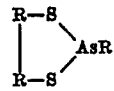

In the case of the mono-thiols it is well known that an equilibrium is established (cf. Cohen, King & Strangeways, J. C. S. 1931, p. 3043).

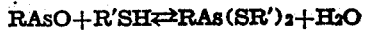

This equilibrium is markedly affected by changes in hydrogen ion concentration, acid reactions causing a shift to the right, and alkaline reactions a shift to the left. At pH 7.3 there is usually and at pH 8.0 there is always a very noticeable dissociation of the complex.

In the case of 1,2- or 1,3-di-thiols on the other hand although the equilibrium is also affected by pH shifts there is no detectable dissociation (by nitroprusside reaction) at pH 8.0-8.5. The reactions here are:

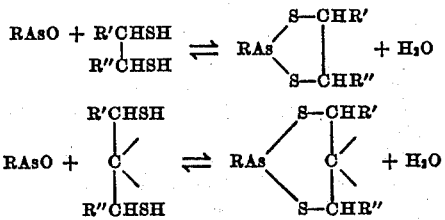

the ring conferring extra stability on the complex formed. This is highly important in its application to the prevention and reversal of the toxicity of trivalent arsenicals to biological SH systems which function at or near pH 7.3, since under physiological conditions it follows that the antidotal effectiveness of mono-thiols would be very much less than that of di-thiols.

In a system which contains equivalent proportions of monothiol SH, protein SH (which can give rise to disulphide groups, and hence probably give large rings with RAsO) and dithiol SH (which can give rise to a 5 or 6-membered ring with RAsO), together with a small amount of RAsO an equilibrium will ultimately be established such that: As combined with dithiol > As combined with protein SH > As combined with monothiol.

We claim:

1. A composition of matter having antidotal and prophylactic properties against trivalent arsenical compounds which comprises a dithiol selected from the group consisting of 1,3-dimercaptopropane; 1,3-dimercaptopropanol; 2,3-dimercaptopropanol; 2,3-dimercaptopropyl methyl ether; 1,2-dimercaptopropane; and 1,2-dimercaptoethane and an inert carrier therefor comprising a relatively non-volatile solvent selected from the group consisting of solvent oils and solvent fats.

2. A composition of matter as defined by claim 1, wherein the dithiol compound comprises between about 10 and 20% by weight of the total composition.

3. An antidote and prophylactic against trivalent arsenical compounds which comprises 2,3-dimercaptopropanol and an inert carrier therefor comprising a relatively non-volatile solvent selected from the group consisting of solvent oils and solvent fats.

4. An antidote and prophylactic against trivalent arsenical compounds which comprises 1,3-dimercaptopropanol and an inert carrier therefor comprising a relatively non-volatile solvent selected from the group consisting of solvent oils and solvent fats.

5. An antidote and prophylactic against trivalent arsenical compounds which comprises 2,3-dimercaptopropyl methyl ether and an inert carrier therefor comprising a relatively non-volatile solvent selected from the group consisting of solvent oils and solvent fats.

6. A composition of matter having antidotal and prophylactic properties against trivalent arsenical compounds which comprises a dithiol selected from the group consisting of 1,3-dimercaptopropane; 1,3-dimercaptopropanol; 2,3-dimercaptopropanol; 2,3-dimercaptopropyl methyl ether; 1,2-dimercaptopropane; and 1,2-dimercaptoethane and a relatively non-volatile, inert carrier therefor comprising a solvent vegetable oil.

7. A composition of matter having antidotal and prophylactic properties against trivalent arsenical compounds which comprises a dithiol selected from the group consisting of 1,3-dimercaptopropane; 1,3-dimercaptopropanol; 2,3-dimercaptopropanol; 2,3-dimercaptopropyl methyl ether; 1,2-dimercaptopropane; and 1,2-dimercaptoethane and a relatively non-volatile, inert carrier therefor comprising a solvent animal fat.

8. A composition of matter having antidotal and prophylactic properties against trivalent arsenical compounds which comprises a dithiol selected from the group consisting of 1,3-dimercaptopropane; 1,3-dimercaptopropanol; 2,3-dimercaptopropanol; 2,3-dimercaptopropyl methyl ether; 1,2-dimercaptopropane; and 1,2-dimercaptoethane and an inert carrier therefor comprising lanoline.

FOSTER NEVILLE WOODWARD.
ALFRED FRANK MILLIDGE.
EDWARD JAMES GASSON.
RUDOLPH ALBERT PETERS.
LLOYD ARTHUR STOCKEN.
ROBERT HENRY STEWART THOMPSON.

REFERENCES CITED

The following references are of record in the file of this patent:

UNITED STATES PATENTS

| Number | Name | Date |
| --- | --- | --- |
| 1,842,414 | Leaper | Jan. 26, 1932 |
| 1,968,906 | Palmer | Aug. 7, 1934 |
| 1,960,262 | Dreyfus | May 29, 1934 |
| 2,238,790 | Davis et al. | Apr. 15, 1941 |
| 2,130,321 | Kharasch | Sept. 13, 1938 |
| 2,054,282 | Clarkson | Sept. 15, 1936 |
| 2,142,145 | Patrick | Jan. 3, 1939 |

FOREIGN PATENTS

| Number | Country | Date |
| --- | --- | --- |
| 829,219 | France | June 16, 1938 |
| 385,980 | Great Britain | Jan. 21, 1933 |
| 296,986 | Germany | Mar. 14, 1917 |

OTHER REFERENCES

Rheinboldt et al., "Ber. Dent. Chem. Ges.," vol. 70B, pp. 675 to 680 (1937).

Sjöberg, "Ber. Dent., Chem. Ges.," vol. 75B, pp. 13–29 (1942).

Mellor, "Comprehensive Treatise on Inorganic and Theoretical Chemistry," vol. II (1922), pages 641–642.

Sjöberg, Z. physik. Chem. 5213 (1942), pages 212 to 215.